(12) United States Patent
Sanger et al.

(10) Patent No.: US 11,477,593 B2
(45) Date of Patent: *Oct. 18, 2022

(54) DISTRIBUTED AUDIO CAPTURING TECHNIQUES FOR VIRTUAL REALITY (VR), AUGMENTED REALITY (AR), AND MIXED REALITY (MR) SYSTEMS

(71) Applicant: Magic Leap, Inc., Plantation, FL (US)

(72) Inventors: George A. Sanger, Coronado, CA (US); Brian Lloyd Schmidt, Bellevue, WA (US); Anastasia A. Tajik, Fort Lauderdale, FL (US); Terry Micheal O'Gara, Fort Lauderdale, FL (US); David Matthew Shumway, Coral Springs, FL (US); Alan Steven Howarth, Newport Beach, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,767

(22) Filed: Dec. 4, 2019

(65) Prior Publication Data

US 2020/0112813 A1 Apr. 9, 2020

Related U.S. Application Data

(63) Continuation of application No. 15/813,020, filed on Nov. 14, 2017, now Pat. No. 10,531,220.

(Continued)

(51) Int. Cl.
*H04S 7/00* (2006.01)
*H04S 3/00* (2006.01)
(Continued)

(52) U.S. Cl.
CPC .............. *H04S 7/303* (2013.01); *H04S 3/008* (2013.01); *H04R 5/027* (2013.01); *H04R 5/04* (2013.01);
(Continued)

(58) Field of Classification Search
CPC ......... H04W 4/38; H04W 4/70; H04W 4/023; H04W 56/005; H04W 52/16;
(Continued)

(56) References Cited

U.S. PATENT DOCUMENTS 6,850,221 B1 2/2005 Tickle
D514,570 S 2/2006 Ohta
(Continued)

FOREIGN PATENT DOCUMENTS

EP 2 530 957 12/2012
EP 2 874 414 5/2015
(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.

(Continued)

*Primary Examiner* — Lun-See Lao
(74) *Attorney, Agent, or Firm* — Knobbe, Martens, Olson & Bear, LLP

(57) ABSTRACT

Systems, devices, and methods for capturing audio which can be used in applications such as virtual reality, augmented reality, and mixed reality systems. Some systems can include a plurality of distributed monitoring devices. Each monitoring device can include a microphone and a location tracking unit. The monitoring devices can capture audio signals in an environment, as well as location tracking signals which respectively indicate the locations of the monitoring devices over time during capture of the audio signals. The system can also include a processor to receive the audio signals and the location tracking signals. The (Continued)

processor can determine one or more acoustic properties of the environment based on the audio signals and the location tracking signals.

21 Claims, 11 Drawing Sheets

Related U.S. Application Data

(60) Provisional application No. 62/430,268, filed on Dec. 5, 2016.

(51) Int. Cl.
    *H04R 5/04*     (2006.01)
    *H04R 5/027*     (2006.01)

(52) U.S. Cl.
    CPC ...... *H04R 2430/21* (2013.01); *H04R 2460/07* (2013.01); *H04S 2400/11* (2013.01); *H04S 2400/15* (2013.01)

(58) Field of Classification Search
    CPC ............. H04W 52/246; H04W 52/362; H04N 21/4305; H04N 21/43615; H04N 21/8106; H04N 21/8547; H04R 2227/005; H04R 2420/07; H04R 27/00; H04R 3/12; H04R 1/1008; H04R 1/1083; H04R 1/2807; H04R 2430/21; H04R 2460/07; H04R 3/005; H04R 5/027; H04R 5/04; H04S 7/301; H04S 7/307; H04S 2400/11; H04S 2400/15; H04S 3/008; H04S 7/303; H04S 7/304; H04S 7/305; H04S 7/308
    USPC ................ 381/303, 1–3, 56–58; 700/94
    See application file for complete search history.

(56) References Cited

U.S. PATENT DOCUMENTS

| | | | |
|---|---|---|---|
| 9,081,426 B2 | 7/2015 | Armstrong | |
| 9,215,293 B2 | 12/2015 | Miller | |
| D752,529 S | 3/2016 | Loretan et al. | |
| 9,348,143 B2 | 5/2016 | Gao et al. | |
| D759,657 S | 7/2016 | Kujawski et al. | |
| 9,417,452 B2 | 8/2016 | Schowengerdt et al. | |
| 9,470,906 B2 | 10/2016 | Kaji et al. | |
| 9,483,228 B2 | 11/2016 | Saungsomboon et al. | |
| 9,547,174 B2 | 1/2017 | Gao et al. | |
| 9,671,566 B2 | 6/2017 | Abovitz et al. | |
| D794,288 S | 8/2017 | Beers et al. | |
| 9,740,006 B2 | 8/2017 | Gao | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 10,531,220 B2* | 1/2020 | Sanger | .............. H04S 7/303 |
| 2003/0007648 A1* | 1/2003 | Currell | .............. H04S 7/305 381/61 |
| 2006/0028436 A1 | 2/2006 | Armstrong | |
| 2007/0081123 A1 | 4/2007 | Lewis | |
| 2008/0172221 A1* | 7/2008 | Jacoby | .............. G10L 15/20 704/200 |
| 2009/0198987 A1 | 3/2009 | Sumioka et al. | |
| 2009/0262137 A1 | 10/2009 | Walker et al. | |
| 2010/0026809 A1* | 2/2010 | Curry | .............. H04N 5/232935 348/157 |
| 2010/0142715 A1* | 6/2010 | Goldstein | .............. G06F 16/683 381/56 |
| 2011/0040395 A1 | 2/2011 | Kraemer et al. | |
| 2012/0127062 A1 | 5/2012 | Bar-Zeev et al. | |
| 2012/0162549 A1 | 6/2012 | Gao et al. | |
| 2012/0307048 A1 | 12/2012 | Abrahamsson et al. | |
| 2013/0022210 A1* | 1/2013 | Vainiala | .............. G10H 1/16 381/59 |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2013/0259243 A1 | 10/2013 | Heree et al. | |
| 2014/0071539 A1 | 3/2014 | Gao | |
| 2014/0126758 A1 | 5/2014 | Van Der Wijst | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2014/0306866 A1 | 10/2014 | Miller et al. | |
| 2015/0016777 A1 | 1/2015 | Abovitz et al. | |
| 2015/0103306 A1 | 4/2015 | Kaji et al. | |
| 2015/0142454 A1 | 5/2015 | Ojanpera | |
| 2015/0178939 A1 | 6/2015 | Bradski et al. | |
| 2015/0205126 A1 | 7/2015 | Schowengerdt | |
| 2015/0221334 A1* | 8/2015 | King | .............. H04S 7/302 700/94 |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2015/0350801 A1 | 12/2015 | Koppens et al. | |
| 2016/0011419 A1 | 1/2016 | Gao | |
| 2016/0026253 A1 | 1/2016 | Bradski et al. | |
| 2016/0150340 A1 | 5/2016 | Seligmann et al. | |
| 2017/0270941 A1* | 9/2017 | Baeckstroem | ...... G10L 19/0212 |
| 2018/0004481 A1* | 1/2018 | Fallon | .............. G06F 3/167 |
| 2018/0160251 A1 | 6/2018 | Sanger | |

FOREIGN PATENT DOCUMENTS

| | | |
|---|---|---|
| JP | 2013-502183 A | 1/2013 |
| JP | 2014-501945 A | 1/2014 |
| JP | 2014-049885 A | 3/2014 |
| JP | 2016-092772 A | 5/2016 |
| WO | WO 2011/020065 | 2/2011 |
| WO | WO 2012/072798 | 6/2012 |
| WO | WO 2012/177139 | 12/2012 |
| WO | WO 2018/106605 | 6/2018 |

OTHER PUBLICATIONS

Azuma, "a Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

International Search Report and Written Opinion for PCT Application No. PCT/US2017/064540, dated Mar. 1, 2018, 2018.

(56) References Cited

OTHER PUBLICATIONS

International Preliminary Report on Patentability for PCT Application No. PCT/US2017/064540, dated Jun. 11, 2019.

* cited by examiner

DISTRIBUTED AUDIO CAPTURING TECHNIQUES FOR VIRTUAL REALITY (VR), AUGMENTED REALITY (AR), AND MIXED REALITY (MR) SYSTEMS

INCORPORATION BY REFERENCE TO ANY PRIORITY APPLICATIONS

This application is a continuation of U.S. patent application Ser. No. 15/813,020, filed Nov. 14, 2017, and entitled "DISTRIBUTED AUDIO CAPTURING TECHNIQUES FOR VIRTUAL REALITY (VR), AUGMENTED REALITY (AR), AND MIXED REALITY (MR) SYSTEMS," which claims priority to U.S. Provisional Patent Application No. 62/430,268, filed Dec. 5, 2016, and entitled "DISTRIBUTED AUDIO CAPTURING TECHNIQUES FOR VIRTUAL REALITY (VR), AUGMENTED REALITY (AR), AND MIXED REALITY (MR) SYSTEMS." The foregoing applications, and any and all applications for which a foreign or domestic priority claim is identified in the Application Data Sheet as filed with the present application, are hereby incorporated by reference under 37 CFR 1.57.

BACKGROUND

Field

This disclosure relates to distributed audio capturing techniques which can be used in applications such as virtual reality, augmented reality, and mixed reality systems.

Description of the Related Art

Modern computing and display technologies have facilitated the development of virtual reality, augmented reality, and mixed reality systems. Virtual reality, or "VR," systems create a simulated environment for a user to experience. This can be done by presenting computer-generated imagery to the user through a head-mounted display. This imagery creates a sensory experience which immerses the user in the simulated environment. A virtual reality scenario typically involves presentation of only computer-generated imagery rather than also including actual real-world imagery.

Augmented reality systems generally supplement a real-world environment with simulated elements. For example, augmented reality, or "AR," systems may provide a user with a view of the surrounding real-world environment via a head-mounted display. However, computer-generated imagery can also be presented on the display to enhance the real-world environment. This computer-generated imagery can include elements which are contextually-related to the real-world environment. Such elements can include simulated text, images, objects, etc. Mixed reality, or "MR," systems also introduce simulated objects into a real-world environment, but these objects typically feature a greater degree of interactivity than in AR systems.

FIG. 1 depicts an example AR/MR scene 1 where a user sees a real-world park setting 6 featuring people, trees, buildings in the background, and a concrete platform 20. In addition to these items, computer-generated imagery is also presented to the user. The computer-generated imagery can include, for example, a robot statue 10 standing upon the real-world platform 20, and a cartoon-like avatar character 2 flying by which seems to be a personification of a bumble bee, even though these elements 2, 10 are not actually present in the real-world environment.

It can be challenging to produce VR/AR/MR technology that facilitates a natural-feeling, convincing presentation of virtual imagery elements. But audio can help make VR/AR/MR experiences more immersive. Thus, there is a need for improved audio techniques for these types of systems.

SUMMARY

In some embodiments, a system comprises: a plurality of distributed monitoring devices, each monitoring device comprising at least one microphone and a location tracking unit, wherein the monitoring devices are configured to capture a plurality of audio signals from a sound source and to capture a plurality of location tracking signals which respectively indicate the locations of the monitoring devices over time during capture of the plurality of audio signals; and a processor configured to receive the plurality of audio signals and the plurality of location tracking signals, the processor being further configured to generate a representation of at least a portion of a sound wave field created by the sound source based on the audio signals and the location tracking signals.

In some embodiments, a device comprises: a processor configured to carry out a method comprising receiving, from a plurality of distributed monitoring devices, a plurality of audio signals captured from a sound source; receiving, from the plurality of monitoring devices, a plurality of location tracking signals, the plurality of location tracking signals respectively indicating the locations of the monitoring devices over time during capture of the plurality of audio signals; generating a representation of at least a portion of a sound wave field created by the sound source based on the audio signals and the location tracking signals; and a memory to store the audio signals and the location tracking signals.

In some embodiments, a method comprises: receiving, from a plurality of distributed monitoring devices, a plurality of audio signals captured from a sound source; receiving, from the plurality of monitoring devices, a plurality of location tracking signals, the plurality of location tracking signals respectively indicating the locations of the monitoring devices over time during capture of the plurality of audio signals; generating a representation of at least a portion of a sound wave field created by the sound source based on the audio signals and the location tracking signals.

In some embodiments, a system comprises: a plurality of distributed monitoring devices, each monitoring device comprising at least one microphone and a location tracking unit, wherein the monitoring devices are configured to capture a plurality of audio signals in an environment and to capture a plurality of location tracking signals which respectively indicate the locations of the monitoring devices over time during capture of the plurality of audio signals; and a processor configured to receive the plurality of audio signals and the plurality of location tracking signals, the processor being further configured to determine one or more acoustic properties of the environment based on the audio signals and the location tracking signals.

In some embodiments, a device comprises: a processor configured to carry out a method comprising receiving, from a plurality of distributed monitoring devices, a plurality of audio signals captured in an environment; receiving, from the plurality of monitoring devices, a plurality of location tracking signals, the plurality of location tracking signals respectively indicating the locations of the monitoring devices over time during capture of the plurality of audio signals; determining one or more acoustic properties of the environment based on the audio signals and the location tracking signals; and a memory to store the audio signals and the location tracking signals.

In some embodiments, a method comprises: receiving, from a plurality of distributed monitoring devices, a plurality of audio signals captured in an environment; receiving, from the plurality of monitoring devices, a plurality of location tracking signals, the plurality of location tracking signals respectively indicating the locations of the monitoring devices over time during capture of the plurality of audio signals; and determining one or more acoustic properties of the environment based on the audio signals and the location tracking signals.

In some embodiments, a system comprises: a plurality of distributed video cameras located about the periphery of a space so as to capture a plurality of videos of a central portion of the space from a plurality of different viewpoints; a plurality of distributed microphones located about the periphery of the space so as to capture a plurality of audio signals during the capture of the plurality of videos; and a processor configured to receive the plurality of videos, the plurality of audio signals, and location information about the position of each microphone within the space, the processor being further configured to generate a representation of at least a portion of a sound wave field for the space based on the audio signals and the location information.

In some embodiments, a device comprises: a processor configured to carry out a method comprising receiving, from a plurality of distributed video cameras, a plurality of videos of a scene captured from a plurality of viewpoints; receiving, from a plurality of distributed microphones, a plurality of audio signals captured during the capture of the plurality of videos; receiving location information about the positions of the plurality of microphones; and generating a representation of at least a portion of a sound wave field based on the audio signals and the location information; and a memory to store the audio signals and the location tracking signals.

In some embodiments, a method comprises: receiving, from a plurality of distributed video cameras, a plurality of videos of a scene captured from a plurality of viewpoints; receiving, from a plurality of distributed microphones, a plurality of audio signals captured during the capture of the plurality of videos; receiving location information about the positions of the plurality of microphones; and generating a representation of at least a portion of a sound wave field based on the audio signals and the location information.

DETAILED DESCRIPTION

Figure 2:
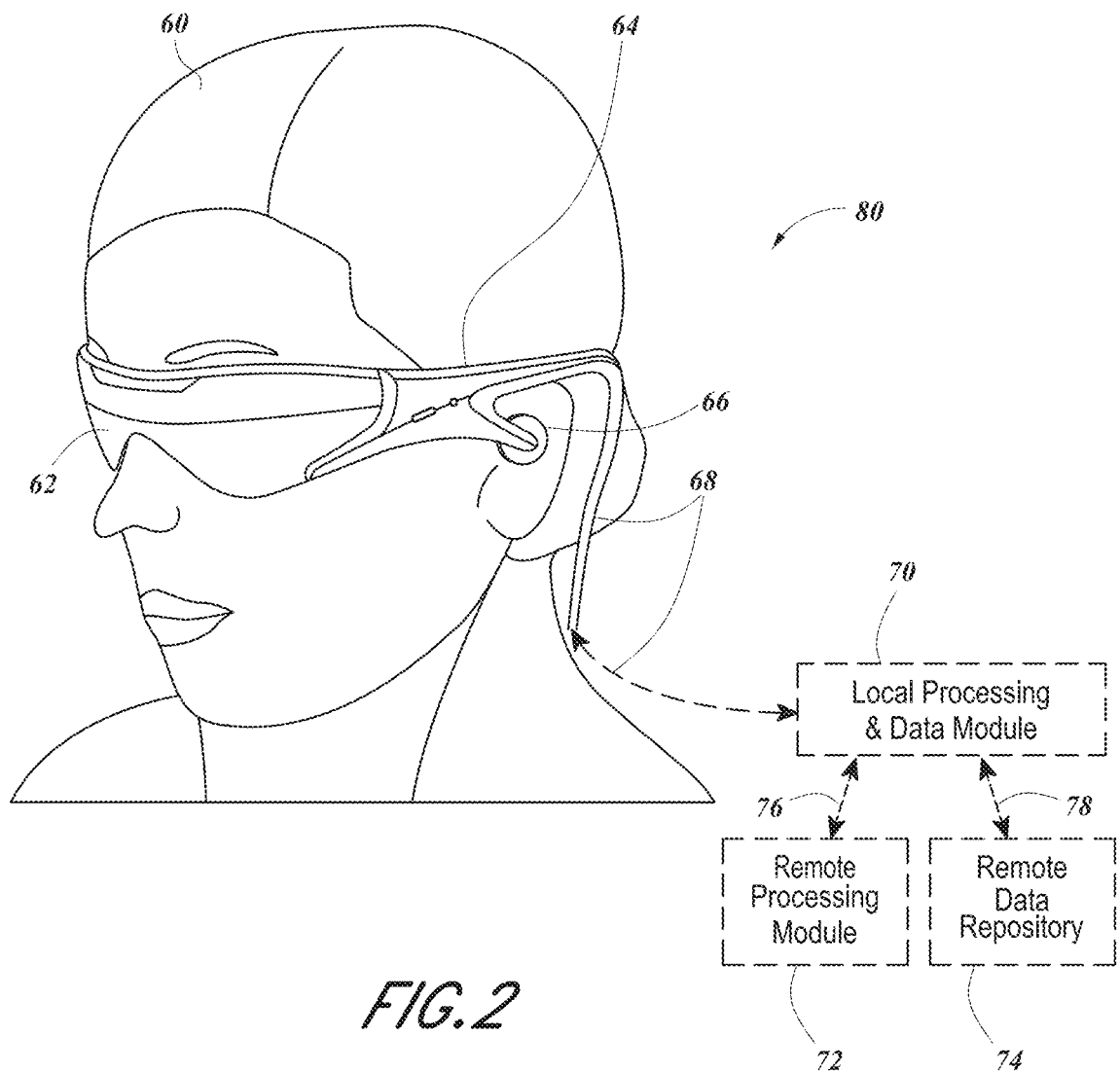
FIG. 2 shows an example VR/AR/MR system.

FIG. 2 shows an example virtual/augmented/mixed reality system 80. The virtual/augmented/mixed reality system 80 includes a display 62, and various mechanical and electronic modules and systems to support the functioning of that display 62. The display 62 may be coupled to a frame 64, which is wearable by a user 60 and which is configured to position the display 62 in front of the eyes of the user 60. In some embodiments, a speaker 66 is coupled to the frame 64 and positioned adjacent the ear canal of the user (in some embodiments, another speaker, not shown, is positioned adjacent the other ear canal of the user to provide for stereo/shapeable sound control). The display 62 is operatively coupled, such as by a wired or wireless connection 68, to a local data processing module 70 which may be mounted in a variety of configurations, such as attached to the frame 64, attached to a helmet or hat worn by the user, embedded in headphones, or otherwise removably attached to the user 60 (e.g., in a backpack-style configuration, in a belt-coupling style configuration, etc.).

The local processing and data module 70 may include a processor, as well as digital memory, such as non-volatile memory (e.g., flash memory), both of which may be utilized to assist in the processing and storing of data. This includes data captured from local sensors provided as part of the system 80, such as image monitoring devices (e.g., cameras), microphones, inertial measurement units, accelerometers, compasses, GPS units, radio devices, and/or gyros. The local sensors may be operatively coupled to the frame 64 or otherwise attached to the user 60. Alternatively, or additionally, sensor data may be acquired and/or processed using a remote processing module 72 and/or remote data repository 74, possibly for passage to the display 62 and/or speaker 66 after such processing or retrieval. In some embodiments, the local processing and data module 70 processes and/or stores data captured from remote sensors, such as those in the audio/location monitoring devices 310 shown in FIG. 3, as discussed herein. The local processing and data module 70 may be operatively coupled by communication links (76, 78), such as via a wired or wireless communication links, to the remote processing module 72 and remote data repository 74 such that these remote modules (72, 74) are operatively coupled to each other and available as resources to the local processing and data module 70. In some embodiments, the remote data repository 74 may be available through the Internet or other networking configuration in a "cloud" resource configuration.

Sound Wave Field Capture and Usage In VR, AR, AND MR Systems

This section relates to using audio recordings from multiple distributed devices to create a representation of at least a portion of a sound wave field which can be used in applications such as virtual reality (VR), augmented reality (AR), and mixed reality (MR) systems.

Sounds result from pressure variations in a medium such as air. These pressure variations are generated by vibrations at a sound source. The vibrations from the sound source then propagate through the medium as longitudinal waves. These waves are made up of alternating regions of compression (increased pressure) and rarefaction (reduced pressure) in the medium.

Various quantities can be used to characterize the sound at a point in space. These can include, for example, pressure values, vibration amplitudes, frequencies, or other quantities. A sound wave field generally consists of a collection of one or more such sound-defining quantities at various points in space and/or various points in time. For example, a sound wave field can consist of a measurement or other characterization of the sound present at each point on a spatial grid at various points in time. Typically, the spatial grid of a sound wave field consists of regularly spaced points and the measurements of the sound are taken at regular intervals of time. But the spatial and/or temporal resolution of the sound wave field can vary depending on the application. Certain models of the sound wave field, such as representation by a set of point sources, can be evaluated at arbitrary locations specified by floating point coordinates and not tied to a predefined grid.

A sound wave field can include a near field region relatively close to the sound source and a far field region beyond the near field region. The sound wave field can be made up of sound waves which propagate freely from the source without obstruction and of waves that reflect from objects within the region or from the boundaries of the region.

Figure 3:
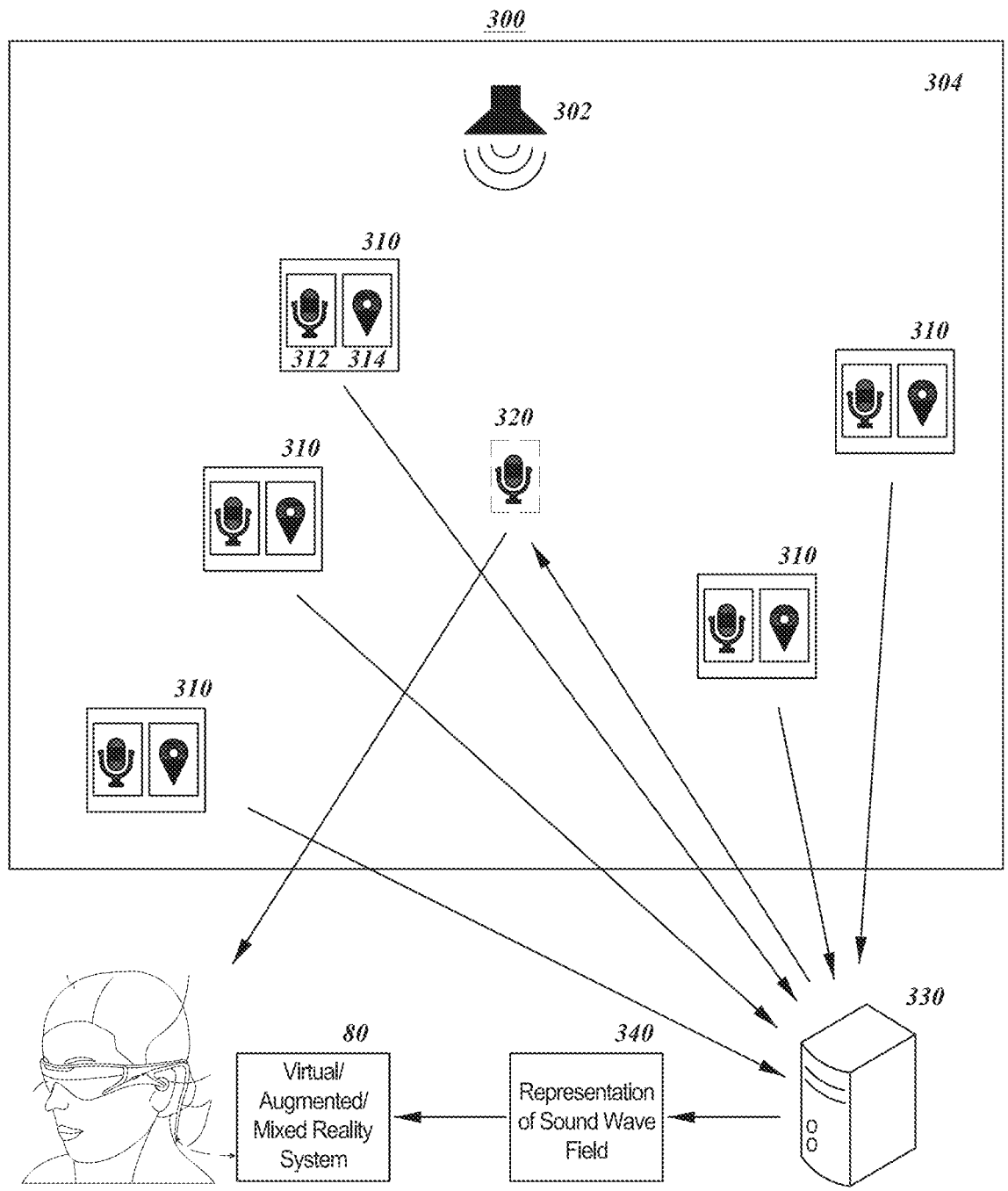
FIG. 3 illustrates a system for using a plurality of distributed devices to create a representation of a sound wave field.

FIG. 3 illustrates a system 300 for using a plurality of distributed devices 310 to create a representation of a sound wave field 340. In some embodiments, the system 300 can be used to provide audio for a VR/AR/MR system 80, as discussed further herein. As shown in FIG. 3, a sound source 302 projects sound into an environment 304. The sound source 302 can represent, for example, a performer, an instrument, an audio speaker, or any other source of sound. The environment 304 can be any indoor or outdoor space including, for example, a concert hall, an amphitheater, a conference room, etc. Although only a single sound source 302 is illustrated, the environment 304 can include multiple sound sources. And the multiple sound sources can be distributed throughout the environment 304 in any manner.

The system 300 includes a plurality of distributed audio and/or location monitoring devices 310. Each of these devices can be physically distinct and can operate independently. The monitoring devices 310 can be mobile (e.g., carried by a person) and can be spaced apart in a distributed manner throughout the environment 304. There need not be any fixed relative spatial relationship between the monitoring devices 310. Indeed, as the monitoring devices 310 are independently mobile, the spatial relationship between the various devices 310 can vary over time. Although five monitoring devices 300 are illustrated, any number of monitoring devices can be used. Further, although FIG. 3 is a two-dimensional drawing and therefore shows the monitoring devices 300 as being distributed in two dimensions, they can also be distributed throughout all three dimensions of the environment 304.

Each monitoring device 310 includes at least one microphone 312. The microphones 312 can be, for example, isotropic or directional. Useable microphone pickup patterns can include, for example, cardioid, hyper cardioid, and supercardioid. The microphones 312 can be used by the monitoring devices 310 to capture audio signals by transducing sounds from one or more sound sources 302 into electrical signals. In some embodiments, the monitoring devices 310 each include a single microphone and record monaural audio. But in other embodiments the monitoring devices 310 can include multiple microphones and can capture, for example, stereo audio. Multiple microphones 312 can be used to determine the angle-of-arrival of sound waves at each monitoring device 310.

Although not illustrated, the monitoring devices 310 can also each include a processor and a storage device for locally recording the audio signal picked up by the microphone 312. Alternatively and/or additionally, each monitoring device 310 can include a transmitter (e.g., a wireless transmitter) to allow captured sound to be digitally encoded and transmitted in real-time to one or more remote systems or devices (e.g., processor 330). Upon receipt at a remote system or device, the captured sound can be used to update a stored model of the acoustic properties of the space in which the sound was captured, or it can be used to create a realistic facsimile of the captured sound in a VR/AR/MR experience, as discussed further herein.

Each monitoring device 310 also includes a location tracking unit 314. The location tracking unit 314 can be used to track the location of the monitoring device 310 within the environment 304. Each location tracking unit 314 can express the location of its corresponding monitoring device 310 in an absolute sense or in a relative sense (e.g., with respect to one or more other components of the system 300). In some embodiments, each location tracking unit 314 creates a location tracking signal, which can indicate the location of the monitoring device 310 as a function of time. For example, a location tracking signal could include a series of spatial coordinates indicating where the monitoring device 310 was located at regular intervals of time.

In some embodiments, the location tracking units 314 directly measure location. One example of such a location tracking unit 314 is a Global Positioning System (GPS). In other embodiments, the location tracking units 314 indirectly measure location. For example, these types of units may infer location based on other measurements or signals. An example of this type of location tracking unit 314 is one which analyzes imagery from a camera to extract features which provide location cues. Monitoring devices 310 can also include audio emitters (e.g., speakers) or radio emitters. Audio or radio signals can be exchanged between monitoring devices and multilateration and/or triangulation can be used to determine the relative locations of the monitoring devices 310.

The location tracking units 314 may also measure and track not just the locations of the monitoring devices 310 but also their spatial orientations using, for example, gyroscopes, accelerometers, and/or other sensors. In some embodiments, the location tracking units 314 can combine data from multiple types of sensors in order to determine the location and/or orientation of the monitoring devices 310.

Figure 5:
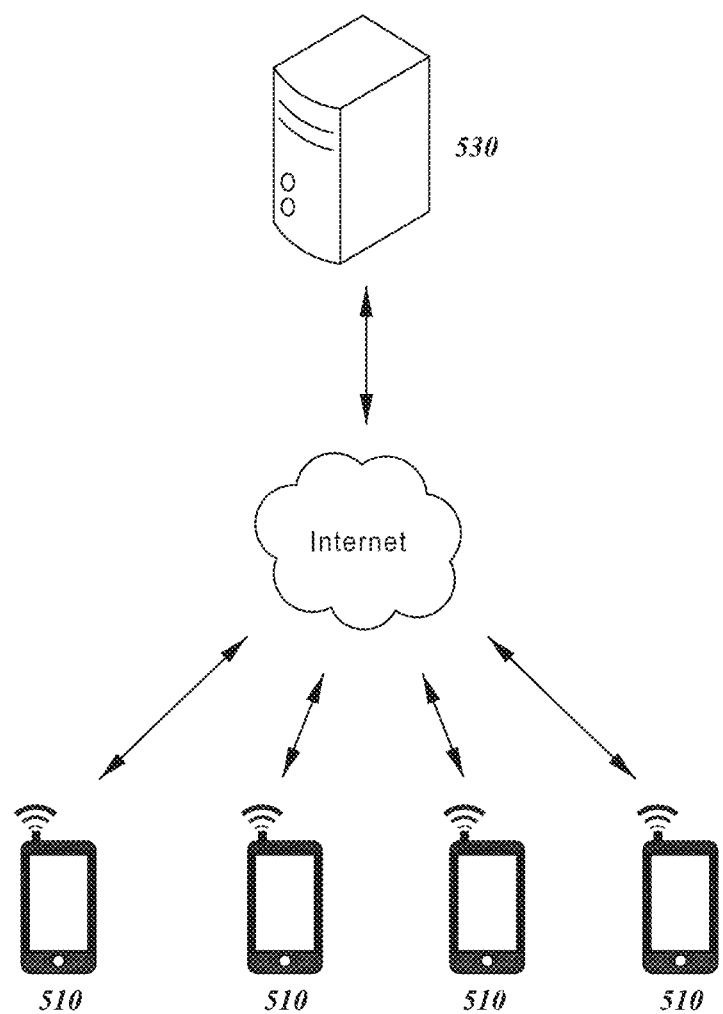
FIG. 5 illustrates a web-based system for using a plurality of user devices to create a representation of a sound wave field for an event.

The monitoring devices 310 can be, for example, smart phones, tablet computers, laptop computers, etc. (as shown in FIG. 5). Such devices are advantageous because they are ubiquitous and often have microphones, GPS units, cameras, gyroscopes, accelerometers, and other sensors built in. The monitoring devices 310 may also be wearable devices, such as VR/AR/MR systems 80.

The system 300 shown in FIG. 3 also includes a processor 330. The processor 330 can be communicatively coupled with the plurality of distributed monitoring devices 310.

Figure 1:
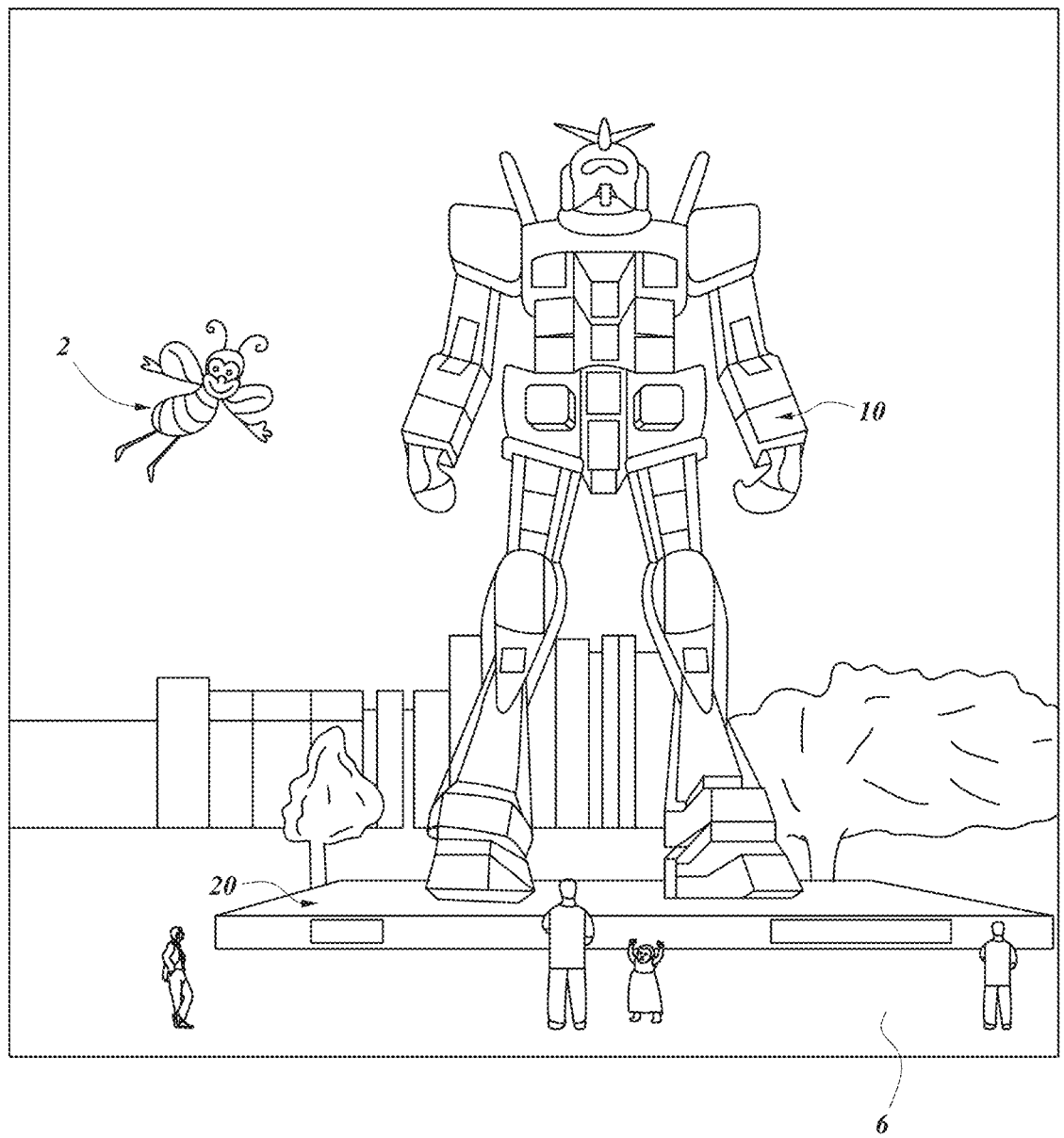
FIG. 1 illustrates a user's view of an augmented/mixed reality scene using an example AR/MR system.

This is illustrated by the arrows from the monitoring devices 310 to the processor 330, which represent communication links between the respective monitoring devices 310 and the processor 330. The communication links can be wired or wireless according to any communication standard or interface. The communication links between the respective monitoring devices 310 and the processor 330 can be used to download audio and location tracking signals to the processor 330. In some embodiments, the processor 330 can be part of the VR/AR/MR system 80 shown in FIG. 1. For example, the processor 330 could be the local processing module 70 or the remote processing module 72.

The processor 330 includes an interface which can be used to receive the respective captured audio signals and location tracking signals from the monitoring devices 310. The audio signals and location tracking signals can be uploaded to the processor 330 in real time as they are captured, or they can be stored locally by the monitoring devices 310 and uploaded after completion of capture for some time interval or for some events, etc. The processor 330 can be a general purpose or specialized computer and can include volatile and/or non-volatile memory/storage for processing and storing the audio signals and the location tracking signals from the plurality of distributed audio monitoring devices 310. The operation of the system 300 will now be discussed with respect to FIG. 4.

Figure 4:
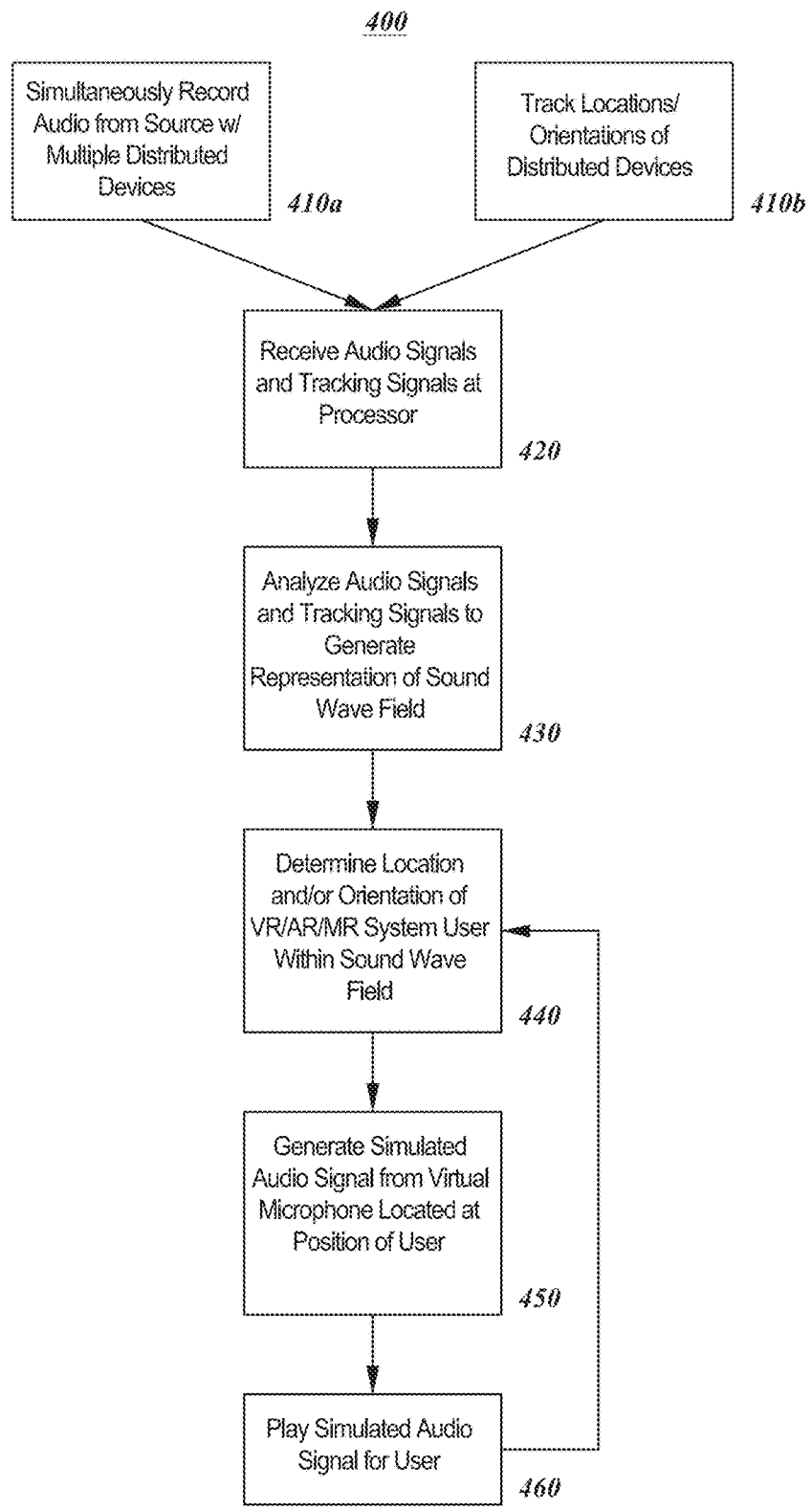
FIG. 4 is a flowchart which illustrates an example embodiment of a method of operation of the system shown in FIG. 3 for creating a sound wave field.

FIG. 4 is a flowchart which illustrates an example embodiment of a method 400 of operation of the system 300 shown in FIG. 3. At blocks 410a and 410b, which are carried out concurrently, the monitoring devices 310 capture audio signals from the sound source 302 at multiple distributed locations throughout the environment 304 while also tracking their respective locations. Each audio signal may typically be a digital signal made up of a plurality of sound measurements taken at different points in time, though analog audio signals can also be used. Each location tracking signal may also typically be a digital signal which includes a plurality of location measurements taken at different points in time. The resulting audio signals and location tracking signals from the monitoring devices 310 can both be appropriately time stamped so that each interval of audio recording can be associated with a specific location within the environment 304. In some embodiments, sound samples and location samples are synchronously taken at regular intervals in time, though this is not required.

At block 420, the processor 330 receives the audio signals and the tracking signals from the distributed monitoring devices 310. The signals can be uploaded from the monitoring devices 310 on command or automatically at specific times or intervals. Based on timestamp data in the audio and location tracking signals, the processor 330 can synchronize the various audio and location tracking signals received from the plurality of monitoring devices 310.

At block 430, the processor 330 analyzes the audio signals and tracking signals to generate a representation of at least a portion of the sound wave field within the environment 304. In some embodiments, the environment 304 is divided into a grid of spatial points and the sound wave field includes one or more values (e.g., sound measurements) per spatial point which characterize the sound at that spatial point at a particular point in time or over a period of time. Thus, the data for each spatial point on the grid can include a time series of values which characterize the sound at that spatial point over time. (The spatial and time resolution of the sound wave field can vary depending upon the application, the number of monitoring devices 310, the time resolution of the location tracking signals, etc.)

In general, the distributed monitoring devices 310 only perform actual measurements of the sound wave field at a subset of locations on the grid of points in the environment 304. In addition, as the monitoring devices 310 are mobile, the specific subset of spatial points represented with actual sound measurements at each moment in time can vary. Thus, the processor 330 can use various techniques to estimate the sound wave field for the remaining spatial points and times so as to approximate the missing information. For example, the sound wave field can be approximately reproduced by simulating a set of point sources of sound where each point source in the set corresponds in location to a particular one of the monitoring devices and outputs audio that was captured by the particular one of the monitoring devices. In addition, multilateration, triangulation or other localization methods based on the audio segments received at the monitoring devices 310 can be used to determine coordinates of sound sources and then a representation of the sound wave field that is included in virtual content can include audio segments emanating from the determined coordinates (i.e., a multiple point source model). Although the sound wave field may comprise a large number of spatial points, it should be understood that the processor 330 need not necessarily calculate the entire sound wave field but rather can calculate only a portion of it, as needed based on the application. For example, the processor 330 may only calculate the sound wave field for a specific spatial point of interest. This process can be performed iteratively as the spatial point of interest changes.

The processor 330 can also perform sound localization to determine the location(s) of, and/or the direction(s) toward, one or more sound sources 302 within the environment 304. Sound localization can be done according to a number of techniques, including the following (and combinations of the same): comparison of the respective times of arrival of certain identified sounds at different locations in the environment 304; comparison of the respective magnitudes of certain identified sounds at different locations in the environment 304; comparison of the magnitudes and/or phases of certain frequency components of certain identified sounds at different locations in the environment 304. In some embodiments, the processor 330 can compute the cross correlation between audio signals received at different monitoring devices 310 in order to determine the Time Difference of Arrival (TDOA) and then use multilateration to determine the location of the audio source(s). Triangulation may also be used. The processor 330 can also extract audio from an isolated sound source. A time offset corresponding to the TDOA for each monitoring device from a particular audio source can be subtracted from each corresponding audio track captured by a set of the monitoring devices in order to synchronize the audio content from the particular source before summing audio tracks in order to amplify the particular source. The extracted audio can be used in a VR/AR/MR environment, as discussed herein.

The processor 330 can also perform transforms on the sound wave field as a whole. For example, by applying a stored source elevation, azimuth, and distance ($\theta$, $\varphi$, r) dependent Head Related Transfer Functions (HRTF), the processor 330 can modify captured audio for output through left and right speaker channels for any position and orientation relative to the sound source in a virtual coordinate system. Additionally, the processor 330 can apply rotational transforms to the sound wave field. In addition, since the processor 330 can extract audio from a particular sound source 302 within the environment, that source can be placed and/or moved to any location within a modeled environment by using three dimensional audio processing.

Once the processor 330 has calculated a representation of the sound wave field 340, it can be used to estimate the audio signal which would have been detected by a microphone at any desired location within the sound wave field. For example, FIG. 3 illustrates a virtual microphone 320. The virtual microphone 320 is not a hardware device which captures actual measurements of the sound wave field at the location of the virtual microphone 320. Instead, the virtual microphone 320 is a simulated construct which can be placed at any location within the environment 304. Using the representation of the sound wave field 340 within the environment 304, the processor 330 can determine a simulated audio signal which is an estimate of the audio signal which would have been detected by a physical microphone located at the position of the virtual microphone 320. This can be done by, for example, determining the grid point in the sound wave field nearest to the location of the virtual microphone for which sound data is available and then associating that sound data with the virtual microphone. In other embodiments, the simulated audio signal from the virtual microphone 320 can be determined by, for example, interpolating between audio signals from multiple grid points in the vicinity of the virtual microphone. The virtual microphone 320 can be moved about the environment 304 (e.g., using a software control interface) to any location at any time. Accordingly, the process of associating sound data with the virtual microphone 320 based on its current location can be repeated iteratively over time as the virtual microphone moves.

The method 400 can continue on to blocks 440-460. In these blocks, the representation of the sound wave field 340 can be provided to a VR/AR/MR system 80, as shown in FIG. 3. As already discussed, the VR/AR/MR system 80 can be used to provide a simulated experience within a virtual environment or an augmented/mixed reality experience within an actual environment. In the case of a virtual reality experience, the sound wave field 340, which has been collected from a real world environment 304, can be transferred or mapped to a simulated virtual environment. In the case of an augmented and/or mixed reality experience, the sound wave field 340 can be transferred or mapped from one real world environment 304 to another.

Whether the environment experienced by the user is an actual environment or a virtual one, at block 440 of FIG. 4, the VR/AR/MR system 80 can determine the location and/or orientation of the user within the virtual or actual environment as the user moves around within the environment. Based on the location and/or orientation of the user within the virtual or actual environment, the VR/AR/MR system 80 (or the processor 330) can associate the location of the user with a point in the representation of the sound wave field 340.

At block 450 of FIG. 4, the VR/AR/MR reality system 80 (or the processor 330) can generate a simulated audio signal that corresponds to the location and/or orientation of the user within the sound wave field. For example, as discussed herein, one or more virtual microphones 320 can be positioned at the location of the user and the system 80 (or the processor 330) can use the representation of the sound wave field 340 in order to simulate the audio signal which would have been detected by an actual microphone at that location.

At block 460, the simulated audio signal from a virtual microphone 320 is provided to the user of the VR/AR/MR system 80 via, for example, headphones worn by the user. Of course, the user of the VR/AR/MR reality system 80 can move about within the environment. Therefore, blocks 440-460 can be repeated iteratively as the position and/or orientation of the user within the sound wave field changes. In this way, the system 300 can be used to provide a realistic audio experience to the user of the VR/AR/MR system 80 as if he or she were actually present at any point within the environment 304 and could move about through it.

FIG. 5 illustrates a web-based system 500 for using a plurality of user devices 510 to create a representation of a sound wave field for an event. The system 500 includes a plurality of user devices 510 for capturing audio at an event, such as a concert. The user devices 510 are, for example, smart phones, tablet computers, laptop computers, etc. belonging to attendees of the event. Similar to the audio/location monitoring devices 310 discussed with respect to FIG. 3, the user devices 510 in FIG. 5 each include at least one microphone and a location tracking unit, such as GPS. The system also includes a web-based computer server 530 which is communicatively coupled to the user devices 510 via the Internet. Operation of the system 400 is discussed with respect to FIG. 6.

Figure 6:
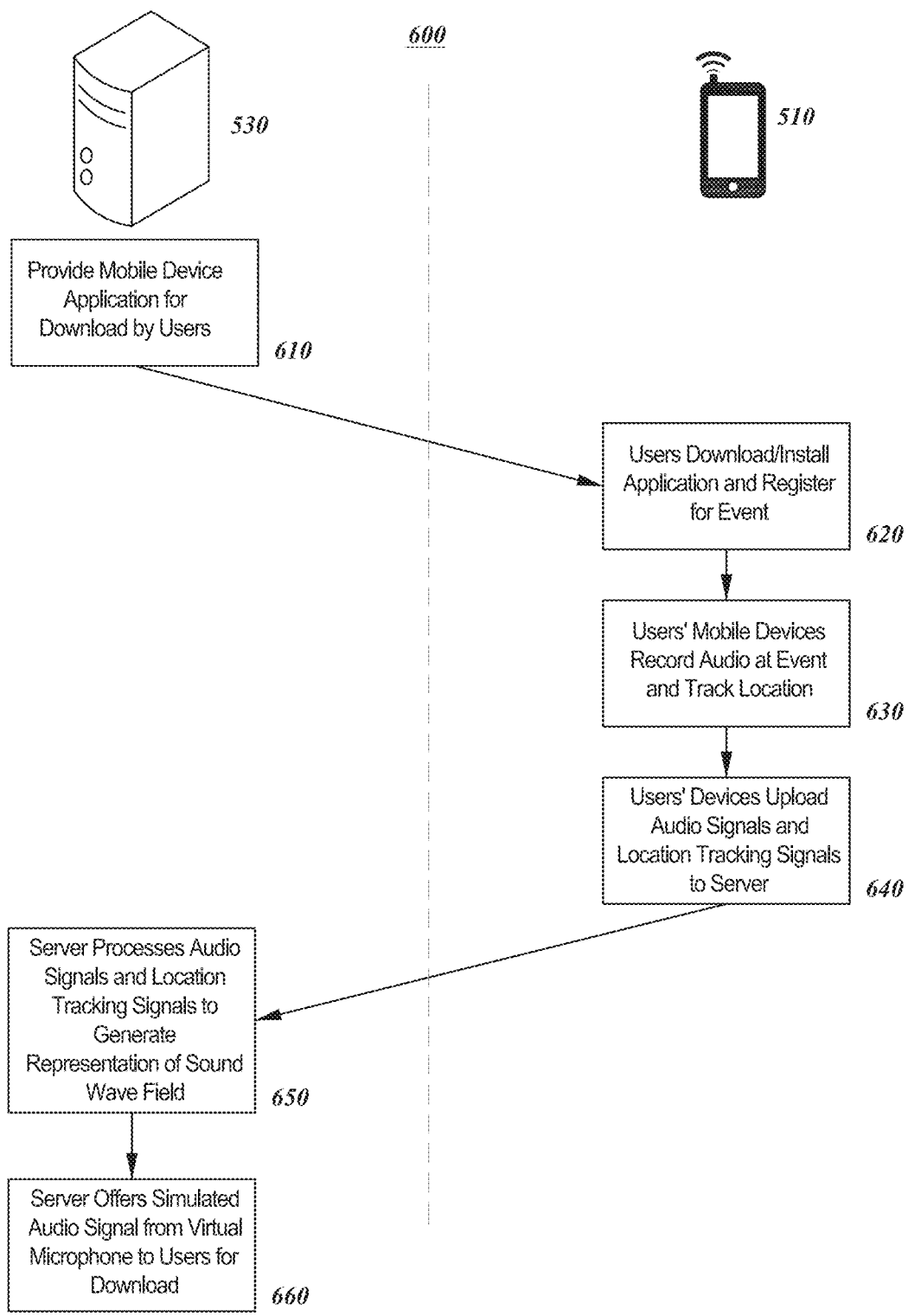
FIG. 6 is a flowchart which illustrates an example embodiment of operation of the web-based system shown in FIG. 5 for creating a sound wave field of an event.

FIG. 6 is a flowchart which illustrates an example embodiment of operation of the web-based system shown in FIG. 5 for creating a sound wave field of an event. At block 610, the computer server 530 provides a mobile device application for download by users. The mobile device application is one which, when installed on a smartphone or other user device, allows users to register for events and to capture audio signals and location tracking signals during the event. Although FIG. 6 shows that the computer server 530 offers the mobile device application for download, the application could also be provided for download on other servers, such as third party application stores.

At block 620, users download the application to their devices 510 and install it. The application can provide a list of events where it can be used to help create a sound wave field of the event. The users select and register for an event at which they will be in attendance.

At block 630, during the event, the application allows users to capture audio from their seats and/or as they move about through the venue. The application also creates a location tracking signal using, for example, the device's built-in GPS. The operation of the devices 410, including the capturing of audio and location tracking signals, can be as described herein with respect to the operation of the audio/location monitoring devices 310.

At block 640, users' devices upload their captured audio signals and location tracking signals to the computer server 530 via the Internet. The computer server 530 then processes the audio signals and location tracking signals in order to generate a representation of a sound wave field for the event. This processing can be done as described herein with respect to the operation of the processor 330.

Finally, at block 660, the computer server 530 offers simulated audio signals (e.g., from selectively positioned virtual microphones) to users for download. The audio signal from a virtual microphone can be created from the sound wave field for the event using the techniques discussed herein. Users can select the position of the virtual microphone via, for example, a web-based interface. In this way, attendees of the event can use the mobile application to experience audio from the event from different locations within the venue and with different perspectives. The application therefore enhances the experience of attendees at a concert or other event.

While the computer server 530 may calculate a sound wave field for the event, as just discussed, other embodiments may use different techniques for allowing users to experience audio from a variety of locations at the event venue. For example, depending upon the density of registered users at the event, the audio signal from a virtual microphone may simply correspond to the audio signal captured by the registered user nearest the location of the virtual microphone. As the position of the virtual microphone changes, or as the nearest registered user varies due to movements of the registered users during the event, the audio from the virtual microphone can be synthesized by cross-fading from the audio signal captured by one registered user to the audio signal captured by another registered user.

Determination of Environmental Acoustic Information Using VR, AR, and MR Systems As already discussed, VR, AR, and MR systems use a display 62 to present virtual imagery to a user 60, including simulated text, images, and objects, in a virtual or real world environment. In order for the virtual imagery to be realistic, it is often accompanied by sound effects and other audio. This audio can be made more realistic if the acoustic properties of the environment are known. For example, if the location and type of acoustic reflectors present in the environment are known, then appropriate audio processing can be performed to add reverb or other effects so as to make the audio sound more convincingly real.

But in the case of AR and MR systems in particular, it can be difficult to determine the acoustic properties of the real world environment where the simulated experience is occurring. Without knowledge of the acoustic properties of the environment, including the type, location, size, etc. of acoustic reflectors and absorbers such as walls, floors, ceilings, and objects, it can be difficult to apply appropriate audio processing to provide a realistic audio environment. For example, without knowledge of the acoustic characteristics of the environment, it can be difficult to realistically add spatialization to simulated objects so as to make their sound effects seem authentic in that environment. There is thus a need for improved techniques for determining acoustic characteristics of an environment so that such acoustic characteristics can be employed in the acoustic models and audio processing used in VR/AR/MR systems.

Figure 7:
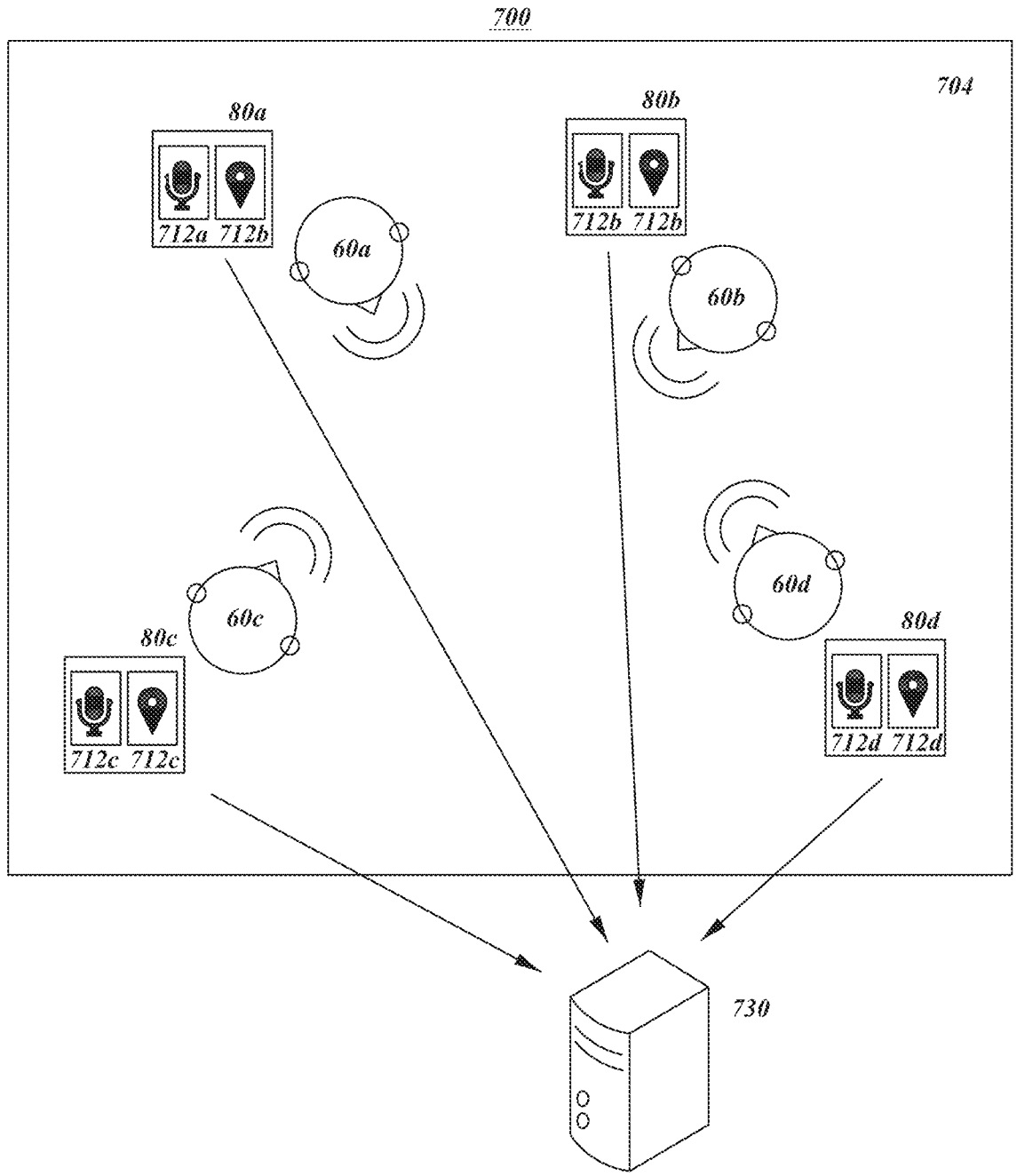
FIG. 7 illustrates an example embodiment of a system which can be used to determine acoustic properties of an environment.

FIG. 7 illustrates an example embodiment of a system 700 which can be used to determine acoustic properties of an environment 704. As shown in FIG. 7, four users 60a, 60b, 60c, and 60d are present in the environment 704. The environment 704 can be, for example, a real world environment being used to host an AR or MR experience. Each user 60 has an associated device 80a, 80b, 80c, and 80d. In some embodiments, these devices are VR/AR/MR systems 80 that the respective users 60 are wearing. These systems 80 can each include a microphone 712 and a location tracking unit 714. The VR/AR/MR systems 80 can also include other sensors, including cameras, gyroscopes, accelerometers, and audio speakers.

The system 700 also includes a processor 730 which is communicatively coupled to the VR/AR/MR systems 80. In some embodiments, the processor 730 is a separate device from the VR/AR/MR systems 80, while in others the processor 730 is a component of one of these systems.

The microphone 712 of each VR/AR/MR system 80 can be used to capture audio of sound sources in the environment 704. The captured sounds can include both known source sounds which have not been significantly affected by the acoustic properties of the environment 704 and environment-altered versions of the source sounds after they have been affected by the acoustic properties of environment. Among these are spoken words and other sounds made by the users 60, sounds emitted by any of the VR/AR/MR systems 80, and sounds from other sound sources which may be present in the environment 704.

Meanwhile, the location tracking units 714 can be used to determine the location of each user 60 within the environment 704 while these audio recordings are being made. In addition, sensors such as gyroscopes and accelerometers can be used to determine the orientation of the users 60 while speaking and/or the orientation of the VR/AR/MR systems 80 when they emit or capture sounds. The audio signals and the location tracking signals can be sent to the processor 730 for analysis. The operation of the system 700 will now be described with respect to FIG. 8.

Figure 8:
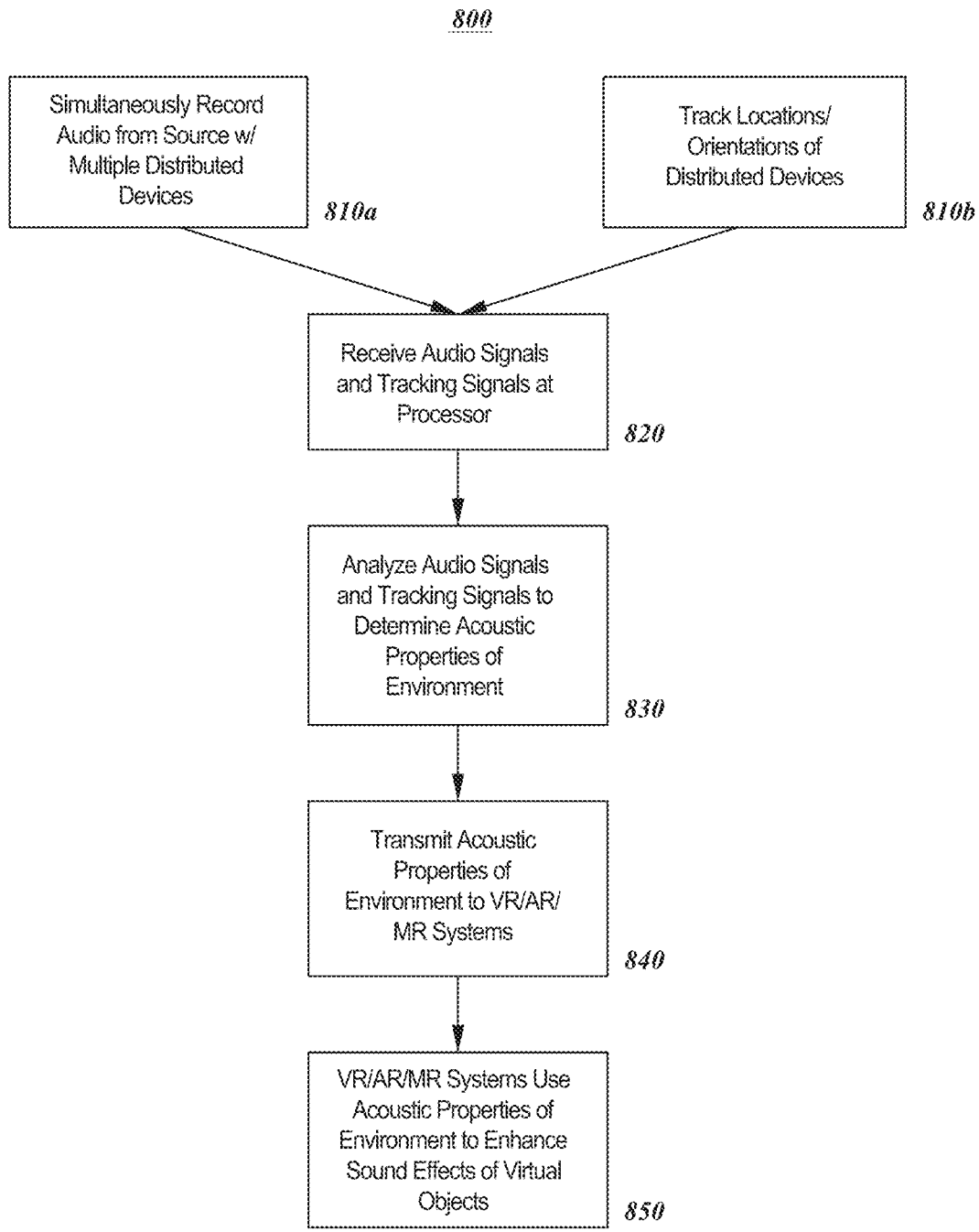
FIG. 8 is a flowchart which illustrates an example embodiment of a method for using the system shown in FIG. 7 to determine one or more acoustic properties of an environment.

FIG. 8 is a flowchart which illustrates an example embodiment of a method 800 for using the system 700 shown in FIG. 7 to determine one or more acoustic properties of an environment 704. The method 800 begins at blocks 810a and 810b, which are carried out concurrently. In these blocks, the VR/AR/MR systems 80 capture audio signals at multiple distributed locations throughout the environment 704 while also tracking their respective locations and/or orientations. Once again, each audio signal may typically be a digital signal made up of a plurality of sound measurements taken at different points in time, though analog audio signals can also be used. Each location tracking signal may also typically be a digital signal which includes a plurality of location and/or orientation measurements taken at different points in time. The resulting audio signals and location tracking signals from the VR/AR/MR systems 80 can both be appropriately time stamped so that each interval of audio recording can be associated with a specific location within the environment 704. In some embodiments, sound samples and location samples are synchronously taken at regular intervals in time, though this is not required.

For the processing described later with respect to block 830, it can be advantageous to have an audio copy of at least two types of sounds: 1) known source sounds which are either known a priori or are captured prior to the source sound having been significantly affected by the acoustics of the environment 704; and 2) environment-altered sounds which are captured after having been significantly affected by the acoustics of the environment 704.

In some embodiments, one or more of the VR/AR/MR systems 80 can be used to emit a known source sound from an audio speaker, such as an acoustic impulse or one or more acoustic tones (e.g., a frequency sweep of tones within the range of about 20 Hz to about 20 kHz, which is approximately the normal range of human hearing). If the system 80a is used to emit a known source sound, then the microphones of the remaining systems 80b, 80c, and 80d can be used to acquire the corresponding environment-altered sounds. Acoustic impulses and frequency sweeps can be advantageous because they can be used to characterize the acoustic frequency response of the environment 704 for a wide range of frequencies, including the entire range of frequencies which are audible to the human ear. But sounds outside the normal range of human hearing can also be used. For example, ultrasonic frequencies can be emitted by the VR/AR/MR systems 80 and used to characterize one or more acoustic and/or spatial properties of the environment 704.

As an alternative to using known source sounds emitted by the VR/AR/MR systems 80 themselves, captured audio of spoken words or other sounds made by one or more of the users 60 can also be used as known source sounds. This can be done by using a user's own microphone to capture his or her utterances. For example, the microphone 712a of the VR/AR/MR system 80a corresponding to user 60a can be used to capture audio of him or her speaking. Because the sounds from user 60a are captured by his or her own microphone 712a before being significantly affected by acoustic reflectors and/or absorbers in the environment 704, these recordings by the user's own microphone can be considered and used as known source sound recordings. The same can be done for the other users 60b, 60c, and 60d using their respective microphones 712b, 712c, and 712d. Of course, some processing can be performed on these audio signals to compensate for differences between a user's actual utterances and the audio signal that is picked up by his or her microphone. (Such differences can be caused by effects such as a user's microphone 712a not being directly located within the path of sound waves emitted from the user's mouth.) Meanwhile, the utterances from one user can be captured by the microphones of other users to obtain environment-altered versions of the utterances. For example, the utterances of user 60a can be captured by the respective VR/AR/MR systems 80b, 80c, and 80d of the remaining users 60b, 60c, and 60d and these recordings can be used as the environment-altered sounds.

In this way, utterances from the users 60 can be used to determine the acoustic frequency response and other characteristics of the environment 704, as discussed further herein. While any given utterance from a user may not include diverse enough frequency content to fully characterize the frequency response of the environment 704 across the entire range of human hearing, the system 700 can build up the frequency response of the environment iteratively over time as utterances with new frequency content are made by the users 60.

In addition to using sounds to determine acoustic characteristics such as the frequency response of the environment 704, they can also be used to determine information about the spatial characteristics of the environment 704. Such spatial information may include, for example, the location, size, and/or reflective/absorptive properties of features within the environment. This can be accomplished because the location tracking units 714 within the VR/AR/MR systems 80 can also measure the orientation of the users 60 when making utterances or the orientation of the systems 80 when emitting or capturing sounds. As already mentioned, this can be accomplished using gyroscopes, accelerometers, or other sensors built into the wearable VR/AR/MR systems 80. Because the orientation of the users 60 and VR/AR/MR systems 80 can be measured, the direction of propagation of any particular known source sound or environment-altered sound can be determined. This information can be processed using sonar techniques to determine characteristics about the environment 704, including sizes, shapes, locations, and/or other characteristics of acoustic reflectors and absorbers within the environment.

At block 820, the processor 730 receives the audio signals and the tracking signals from the VR/AR/MR systems 80. The signals can be uploaded on command or automatically at specific times or intervals. Based on timestamp data in the audio and location tracking signals, the processor 730 can synchronize the various audio and location tracking signals received from the VR/AR/MR systems 80.

At block 830, the processor 730 analyzes the audio signals and tracking signals to determine one or more acoustic properties of the environment 704. This can be done, for example, by identifying one or more known source sounds from the audio signals. The known source sounds may have been emitted at a variety of times from a variety of locations within the environment 704 and in a variety of directions. The times can be determined from timestamp data in the audio signals, while the locations and directions can be determined from the location tracking signals.

The processor 730 may also identify and associate one or more environment-altered sounds with each known source sound. The processor 730 can then compare each known source sound with its counterpart environment-altered sound (s). By analyzing differences in frequency content, phase, time of arrival, etc., the processor 730 can determine one or more acoustic properties of the environment 730 based on the effect of the environment on the known source sounds. The processor 730 can also use sonar processing techniques to determine spatial information about the locations, sizes, shapes, and characteristics of objects or surfaces within the environment 704.

At block 840, the processor 730 can transmit the determined acoustic properties of the environment 704 back to the VR/AR/MR systems 80. These acoustic properties can include the acoustic reflective/absorptive properties of the environment, the sizes, locations, and shapes of objects within the space, etc. Because there are multiple monitoring devices, certain of those devices will be closer to each sound source and will therefore likely be able to obtain a purer recording of the original source. Other monitoring devices at different locations will capture sound with varying degrees of reverberation added. By comparing such signals the character of the reverberant properties (e.g., a frequency dependent reverberation decay time) of the environment can be assessed and stored for future use in generating more realistic virtual sound sources. The frequency dependent reverberation time can be stored for multiple positions of monitoring devices and interpolation can be used to obtain values for other positions.

Then, at block 850, the VR/AR/MR systems 80 can use the acoustic properties of the environment 704 to enhance the audio signals played to the users 60 during VR/AR/MR experiences. The acoustic properties can be used to enhance sound effects which accompany virtual objects which are displayed to the users 60. For example the frequency dependent reverberation corresponding to a position of user of the VR/AR/MR system 80 can be applied to virtual sound sources output through the VR/AR/MR system 80.

Audio Capture for Volumetric Videos

Figure 9:
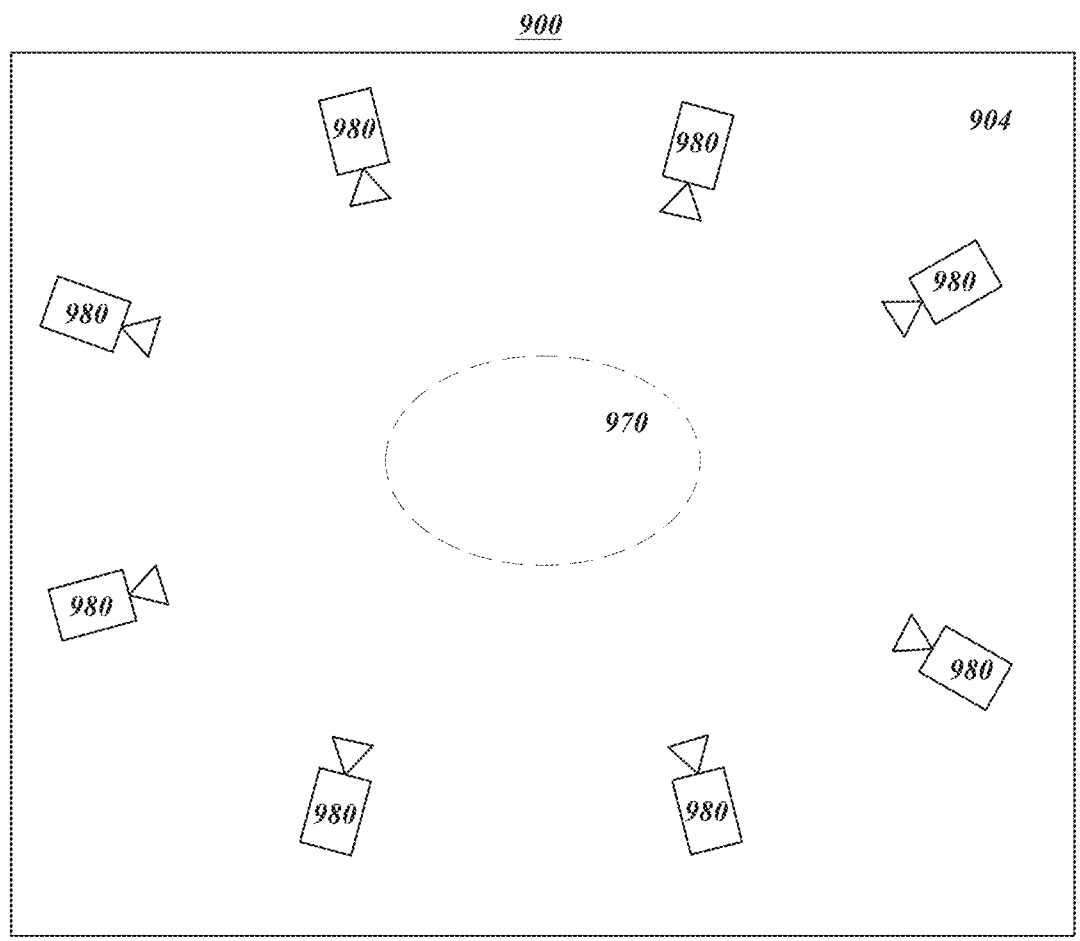
FIG. 9 illustrates an example system for performing volumetric video capture.

Distributed audio/location monitoring devices of the type described herein can also be used to capture audio for volumetric videos. FIG. 9 illustrates an example system 900 for performing volumetric video capture. The system 900 is located in an environment 904, which is typically a green screen room. A green screen room is a room with a central space 970 surrounded by green screens of the type used in chroma key compositing, which is a conventional post-production video processing technique for compositing images or videos based on their color content.

The system 900 includes a plurality of video cameras 980 set up at different viewpoints around the perimeter of the green screen room 904. Each of the video cameras 980 is aimed at the central portion 970 of the green screen room 904 where the scene that is to be filmed is acted out. As the scene is acted out, the video cameras 980 film it from a discrete number of viewpoints spanning a 360° range around the scene. The videos from these cameras 980 can later be mathematically combined by a processor 930 to simulate video imagery which would have been captured by a video camera located at any desired viewpoint within the environment 904, including viewpoints between those which were actually filmed by the cameras 980.

This type of volumetric video can be effectively used in VR/AR/MR systems because it can permit users of these systems to experience the filmed scene from any vantage point. The user can move in the virtual space around the scene and experience it as if its subject were actually present before the user. Thus, volumetric video offers the possibility of providing a very immersive VR/AR/MR experience.

But one difficulty with volumetric video is that it can be hard to effectively capture high-quality audio during this type of filming process. This is because typical audio capture techniques which might employ boom microphones or lavalier microphones worn by the actors might not be feasible because it may not be possible to effectively hide these microphones from the cameras 1080 given that the scene is filmed from many different viewpoints. There is thus a need for improved techniques for capturing audio during the filming of volumetric video.

Figure 10:
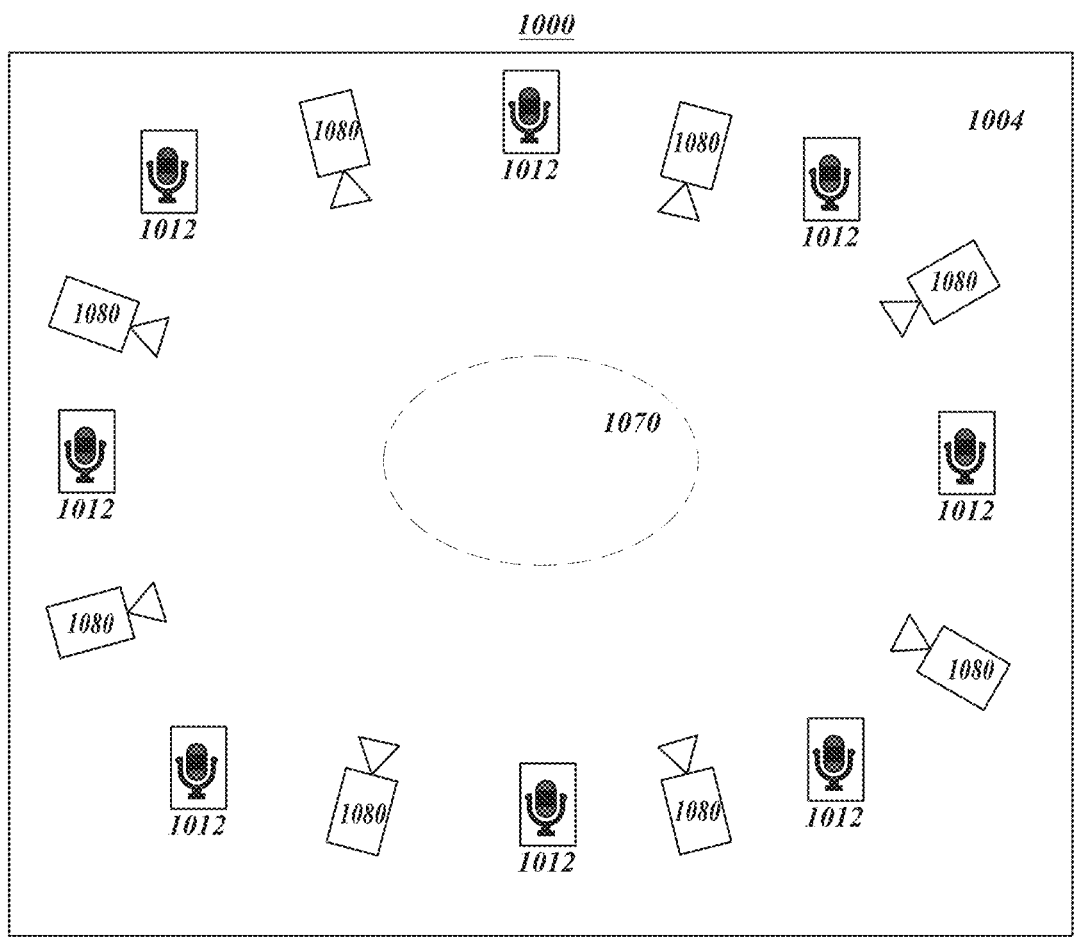
FIG. 10 illustrates an example system for capturing audio during volumetric video capture.

FIG. 10 illustrates an example system 1000 for capturing audio during volumetric video capture. As in FIG. 9, the system 1000 is located in an environment 1004, which may typically be a green screen room. The system 1000 also includes a number of video cameras 1080 which are located at different viewpoints around the green screen room 1004 and are aimed at the center portion 1070 of the room where a scene is to be acted out.

The system 1000 also includes a number of distributed microphones 1012 which are likewise spread out around the perimeter of the room 1004. The microphones 1012 can be located between the video cameras 1080 (as illustrated), they can be co-located with the video cameras, or they can have any other desired configuration. FIG. 10 shows that the microphones 1012 are set up to provide full 360° coverage of the central portion 1070 of the room 1004. For example, the microphones 1012 may be placed at least every 45° around the periphery of the room 1004, or at least every 30°, or at least every 10°, or at least every 5°. Although not illustrated in the two-dimensional drawing of FIG. 10, the microphones 1012 can also be set up to provide three-dimensional coverage. For example, the microphones 1012 could be placed at several discrete locations about an imaginary hemisphere which encloses the space where the scene is acted out. The operation of the system 1000 will now be described with respect to FIG. 11.

Figure 11:
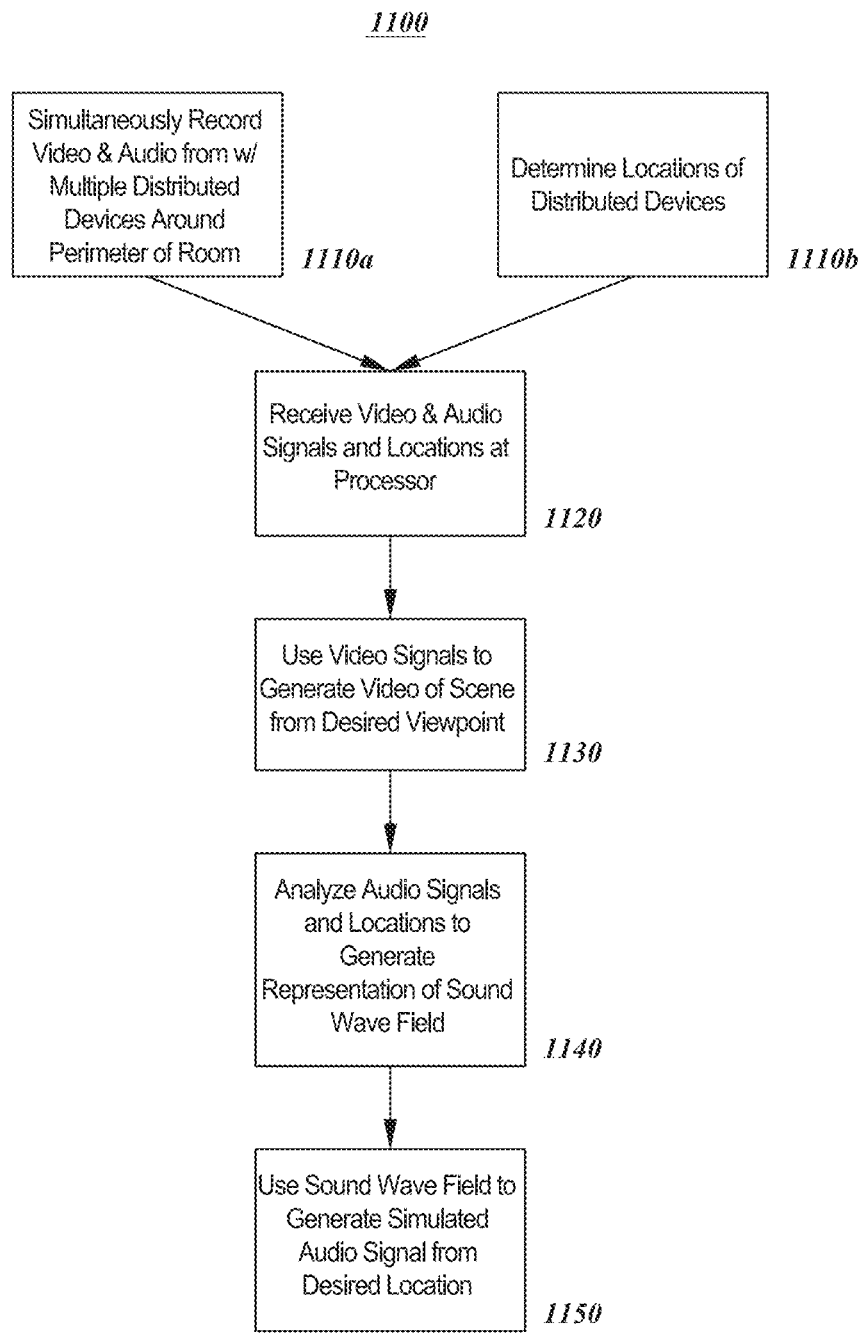
FIG. 11 is a flow chart which shows an example method for using the system shown in FIG. 10 to capture audio for a volumetric video.

FIG. 11 is a flow chart which shows an example method 1100 for using the system 1000 shown in FIG. 10 to capture audio for a volumetric video. At block 1110a, a scene is acted out in the green screen room 1004 and the volumetric video is captured by the cameras 1080 from multiple different viewpoints. Simultaneously, the microphones 1012 likewise capture audio of the scene from a variety of vantage points. The recorded audio signals from each of these microphones 1012 can be provided to a processor 1030 along with the video signals from each of the video cameras 1080, as shown at block 1120.

Each of the audio signals from the respective microphones 1012 can be tagged with location information which indicates the position of the microphone 1012 within the green screen room 1004. At block 1110b, this position information can be determined manually or automatically using location tracking units of the sort described herein. For example, each microphone 1012 can be provided in a monitoring device along with a location tracking unit that can provide data to the processor 1030 regarding the position of the microphone 1012 within the room 1004.

At block 1130, the processor performs the processing required to generate the volumetric video. Accordingly, the processor can generate simulated video which estimates the scene as it would have been filmed by a camera located at any specified viewpoint. At block 1140, the processor analyzes the audio signals from the microphones 1012 to generate a representation of the sound wave field within the environment 1104, as described elsewhere herein. Using the sound wave field, the processor can estimate any audio signal as it would have been captured by a microphone located at any desired point within the environment 1104. This capability allows the flexibility to effectively and virtually specify microphone placement for the volumetric video after it has already been filmed.

In some embodiments, the sound wave field can be mapped to a VR/AR/MR environment and can be used to provide audio for a VR/AR/MR system 80. Just as the viewpoint for the volumetric video can be altered based upon the current viewpoint of a user within a virtual environment, so too can the audio. In some embodiments, the audio listening point can be moved in conjunction with the video viewpoint as the user moves about within the virtual space. In this way, the user can experience a very realistic reproduction of the scene.

EXAMPLE EMBODIMENTS

A system comprising: a plurality of distributed monitoring devices, each monitoring device comprising at least one microphone and a location tracking unit, wherein the monitoring devices are configured to capture a plurality of audio signals from a sound source and to capture a plurality of location tracking signals which respectively indicate the locations of the monitoring devices over time during capture of the plurality of audio signals; and a processor configured to receive the plurality of audio signals and the plurality of location tracking signals, the processor being further configured to generate a representation of at least a portion of a sound wave field created by the sound source based on the audio signals and the location tracking signals.

The system of the preceding embodiment, wherein there is an unknown relative spatial relationship between the plurality of distributed monitoring devices.

The system of any of the preceding embodiments, wherein the plurality of distributed monitoring devices are mobile.

The system of any of the preceding embodiments, wherein the location tracking unit comprises a Global Positioning System (GPS).

The system of any of the preceding embodiments, wherein the representation of the sound wave field comprises sound values at each of a plurality of spatial points on a grid for a plurality of times.

The system of any of the preceding embodiments, wherein the processor is further configured to determine the location of the sound source.

The system of any of the preceding embodiments, wherein the processor is further configured to map the sound wave field to a virtual, augmented, or mixed reality environment.

The system of any of the preceding embodiments, wherein, using the representation of the sound wave field, the processor is further configured to determine a virtual audio signal at a selected location within the sound wave field, the virtual audio signal estimating an audio signal which would have been detected by a microphone at the selected location.

The system of any of the preceding embodiments, wherein the location is selected based on the location of a user of a virtual, augmented, or mixed reality system within a virtual or augmented reality environment.

A device comprising: a processor configured to carry out a method comprising: receiving, from a plurality of distributed monitoring devices, a plurality of audio signals captured from a sound source; receiving, from the plurality of monitoring devices, a plurality of location tracking signals, the plurality of location tracking signals respectively indicating the locations of the monitoring devices over time during capture of the plurality of audio signals; generating a representation of at least a portion of a sound wave field created by the sound source based on the audio signals and the location tracking signals; and a memory to store the audio signals and the location tracking signals.

The device of the preceding embodiment, wherein there is an unknown relative spatial relationship between the plurality of distributed monitoring devices.

The device of any of the preceding embodiments, wherein the plurality of distributed monitoring devices are mobile.

The device of any of the preceding embodiments, wherein the representation of the sound wave field comprises sound values at each of a plurality of spatial points on a grid for a plurality of times.

The device of any of the preceding embodiments, wherein the processor is further configured to determine the location of the sound source.

The device of any of the preceding embodiments, wherein the processor is further configured to map the sound wave field to a virtual, augmented, or mixed reality environment.

The device of any of the preceding embodiments, wherein, using the representation of the sound wave field, the processor is further configured to determine a virtual audio signal at a selected location within the sound wave field, the virtual audio signal estimating an audio signal which would have been detected by a microphone at the selected location.

The device of any of the preceding embodiments, wherein the location is selected based on the location of a user of a virtual, augmented, or mixed reality system within a virtual or augmented reality environment.

A method comprising: receiving, from a plurality of distributed monitoring devices, a plurality of audio signals captured from a sound source; receiving, from the plurality of monitoring devices, a plurality of location tracking signals, the plurality of location tracking signals respectively indicating the locations of the monitoring devices over time during capture of the plurality of audio signals; generating a representation of at least a portion of a sound wave field created by the sound source based on the audio signals and the location tracking signals.

The method of the preceding embodiment, wherein there is an unknown relative spatial relationship between the plurality of distributed monitoring devices.

The method of any of the preceding embodiments, wherein the plurality of distributed monitoring devices are mobile.

The method of any of the preceding embodiments, wherein the representation of the sound wave field comprises sound values at each of a plurality of spatial points on a grid for a plurality of times.

The method of any of the preceding embodiments, further comprising determining the location of the sound source.

The method of any of the preceding embodiments, further comprising mapping the sound wave field to a virtual, augmented, or mixed reality environment.

The method of any of the preceding embodiments, further comprising, using the representation of the sound wave field, determining a virtual audio signal at a selected location within the sound wave field, the virtual audio signal estimating an audio signal which would have been detected by a microphone at the selected location.

The method of any of the preceding embodiments, wherein the location is selected based on the location of a user of a virtual, augmented, or mixed reality system within a virtual or augmented reality environment.

A system comprising: a plurality of distributed monitoring devices, each monitoring device comprising at least one microphone and a location tracking unit, wherein the monitoring devices are configured to capture a plurality of audio signals in an environment and to capture a plurality of location tracking signals which respectively indicate the locations of the monitoring devices over time during capture of the plurality of audio signals; and a processor configured to receive the plurality of audio signals and the plurality of location tracking signals, the processor being further configured to determine one or more acoustic properties of the environment based on the audio signals and the location tracking signals.

The system of the preceding embodiment, wherein the one or more acoustic properties comprise acoustic reflectance or absorption in the environment, or the acoustic frequency response of the environment.

The system of any of the preceding embodiments, wherein there is an unknown relative spatial relationship between the plurality of distributed monitoring devices.

The system of any of the preceding embodiments, wherein the plurality of distributed monitoring devices are mobile.

The system of any of the preceding embodiments, wherein the location tracking unit comprises a Global Positioning System (GPS).

The system of any of the preceding embodiments, wherein the location tracking signals also comprise information about the respective orientations of the monitoring devices.

The system of any of the preceding embodiments, wherein the plurality of distributed monitoring devices comprise virtual reality, augmented reality, or mixed reality systems.

The system of any of the preceding embodiments, wherein the processor is further configured to identify a known source sound within the plurality of audio signals.

The system of any of the preceding embodiments, wherein the known source sound comprises a sound played by one of the virtual reality, augmented reality, or mixed reality systems.

The system of any of the preceding embodiments, wherein the known source sound comprises an acoustic impulse or a sweep of acoustic tones.

The system of any of the preceding embodiments, wherein the known source sound comprises an utterance of a user captured by a virtual reality, augmented reality, or mixed reality system worn by the user.

The system of any of the preceding embodiments, wherein the processor is further configured to identify and associate one or more environment-altered sounds with the known source sound.

The system of any of the preceding embodiments, wherein the processor is further configured to send the one or more acoustic properties of the environment to the plurality of virtual reality, augmented reality, or mixed reality systems.

The system of any of the preceding embodiments, wherein the plurality of virtual reality, augmented reality, or mixed reality systems are configured to use the one or more acoustic properties to enhance audio played to a user during a virtual reality, augmented reality, or mixed reality experience.

A device comprising: a processor configured to carry out a method comprising receiving, from a plurality of distributed monitoring devices, a plurality of audio signals captured in an environment; receiving, from the plurality of monitoring devices, a plurality of location tracking signals, the plurality of location tracking signals respectively indicating the locations of the monitoring devices over time during capture of the plurality of audio signals; determining one or more acoustic properties of the environment based on the audio signals and the location tracking signals; and a memory to store the audio signals and the location tracking signals.

The device of the preceding embodiment, wherein the one or more acoustic properties comprise acoustic reflectance or absorption in the environment, or the acoustic frequency response of the environment.

The device of any of the preceding embodiments, wherein the location tracking signals also comprise information about the respective orientations of the monitoring devices.

The device of any of the preceding embodiments, wherein the plurality of distributed monitoring devices comprise virtual reality, augmented reality, or mixed reality systems.

The device of any of the preceding embodiments, wherein the processor is further configured to identify a known source sound within the plurality of audio signals.

The device of any of the preceding embodiments, wherein the known source sound comprises a sound played by one of the virtual reality, augmented reality, or mixed reality systems.

The device of any of the preceding embodiments, wherein the known source sound comprises an acoustic impulse or a sweep of acoustic tones.

The device of any of the preceding embodiments, wherein the known source sound comprises an utterance of a user captured by a virtual reality, augmented reality, or mixed reality system worn by the user.

The device of any of the preceding embodiments, wherein the processor is further configured to identify and associate one or more environment-altered sounds with the known source sound.

The device of any of the preceding embodiments, wherein the processor is further configured to send the one or more acoustic properties of the environment to the plurality of virtual reality, augmented reality, or mixed reality systems.

A method comprising: receiving, from a plurality of distributed monitoring devices, a plurality of audio signals captured in an environment; receiving, from the plurality of monitoring devices, a plurality of location tracking signals, the plurality of location tracking signals respectively indicating the locations of the monitoring devices over time during capture of the plurality of audio signals; and determining one or more acoustic properties of the environment based on the audio signals and the location tracking signals.

The method of the preceding embodiment, wherein the one or more acoustic properties comprise acoustic reflectance or absorption in the environment, or the acoustic frequency response of the environment.

The method of any of the preceding embodiments, wherein the location tracking signals also comprise information about the respective orientations of the monitoring devices.

The method of any of the preceding embodiments, wherein the plurality of distributed monitoring devices comprise virtual reality, augmented reality, or mixed reality systems.

The method of any of the preceding embodiments, further comprising identifying a known source sound within the plurality of audio signals.

The method of any of the preceding embodiments, wherein the known source sound comprises a sound played by one of the virtual reality, augmented reality, or mixed reality systems.

The method of any of the preceding embodiments, wherein the known source sound comprises an acoustic impulse or a sweep of acoustic tones.

The method of any of the preceding embodiments, wherein the known source sound comprises an utterance of a user captured by a virtual reality, augmented reality, or mixed reality system worn by the user.

The method of any of the preceding embodiments, further comprising identifying and associating one or more environment-altered sounds with the known source sound.

The method of any of the preceding embodiments, further comprising sending the one or more acoustic properties of the environment to the plurality of virtual reality, augmented reality, or mixed reality systems.

A system comprising: a plurality of distributed video cameras located about the periphery of a space so as to capture a plurality of videos of a central portion of the space from a plurality of different viewpoints; a plurality of distributed microphones located about the periphery of the space so as to capture a plurality of audio signals during the capture of the plurality of videos; and a processor configured to receive the plurality of videos, the plurality of audio signals, and location information about the position of each microphone within the space, the processor being further configured to generate a representation of at least a portion of a sound wave field for the space based on the audio signals and the location information.

The system of the preceding embodiment, wherein the plurality of microphones are spaced apart to provide 360° of the space.

The system of any of the preceding embodiments, wherein the representation of the sound wave field comprises sound values at each of a plurality of spatial points on a grid for a plurality of times.

The system of any of the preceding embodiments, wherein the processor is further configured to map the sound wave field to a virtual, augmented, or mixed reality environment.

The system of any of the preceding embodiments, wherein, using the representation of the sound wave field, the processor is further configured to determine a virtual audio signal at a selected location within the sound wave field, the virtual audio signal estimating an audio signal which would have been detected by a microphone at the selected location.

The system of any of the preceding embodiments, wherein the location is selected based on the location of a user of a virtual, augmented, or mixed reality system within a virtual or augmented reality environment.

A device comprising: a processor configured to carry out a method comprising receiving, from a plurality of distributed video cameras, a plurality of videos of a scene captured from a plurality of viewpoints; receiving, from a plurality of distributed microphones, a plurality of audio signals captured during the capture of the plurality of videos; receiving location information about the positions of the plurality of microphones; and generating a representation of at least a portion of a sound wave field based on the audio signals and the location information; and a memory to store the audio signals and the location tracking signals.

The system of the preceding embodiment, wherein the plurality of microphones are spaced apart to provide 360° of the space.

The system of any of the preceding embodiments, wherein the representation of the sound wave field comprises sound values at each of a plurality of spatial points on a grid for a plurality of times.

The system of any of the preceding embodiments, wherein the processor is further configured to map the sound wave field to a virtual, augmented, or mixed reality environment.

The system of any of the preceding embodiments, wherein, using the representation of the sound wave field, the processor is further configured to determine a virtual audio signal at a selected location within the sound wave field, the virtual audio signal estimating an audio signal which would have been detected by a microphone at the selected location.

The system of any of the preceding embodiments, wherein the location is selected based on the location of a user of a virtual, augmented, or mixed reality system within a virtual or augmented reality environment.

A method comprising: receiving, from a plurality of distributed video cameras, a plurality of videos of a scene captured from a plurality of viewpoints; receiving, from a plurality of distributed microphones, a plurality of audio signals captured during the capture of the plurality of videos; receiving location information about the positions of the plurality of microphones; and generating a representation of at least a portion of a sound wave field based on the audio signals and the location information.

The method of the preceding embodiment, wherein the plurality of microphones are spaced apart to provide 360° of the space.

The method of any of the preceding embodiments, wherein the representation of the sound wave field comprises sound values at each of a plurality of spatial points on a grid for a plurality of times.

The method of any of the preceding embodiments, further comprising mapping the sound wave field to a virtual, augmented, or mixed reality environment.

The method of any of the preceding embodiments, further comprising, using the representation of the sound wave field, determining a virtual audio signal at a selected location within the sound wave field, the virtual audio signal estimating an audio signal which would have been detected by a microphone at the selected location.

The method of any of the preceding embodiments, wherein the location is selected based on the location of a user of a virtual, augmented, or mixed reality system within a virtual or augmented reality environment.

CONCLUSION

For purposes of summarizing the disclosure, certain aspects, advantages and features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, methods, etc. described herein. A wide variety of variation is possible. Components, elements, and/or steps may be altered, added, removed, or rearranged.

The devices and methods described herein can advantageously be at least partially implemented using, for example, computer software, hardware, firmware, or any combination of software, hardware, and firmware. Software modules can comprise computer executable code, stored in a computer's memory, for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on non-transitory computer-readable media (e.g., optical disks such as CDs or DVDs, hard disk drives, flash memories, diskettes, or the like) that, when read by a computer or other processing device, cause it to carry out the method.

While certain embodiments have been explicitly described, other embodiments will become apparent to those of ordinary skill in the art based on this disclosure.

What is claimed is:

1. A system comprising:
a plurality of distributed monitoring devices which comprise wearable virtual reality, augmented reality, or mixed reality display systems, each monitoring device comprising at least one microphone and a location tracking unit, wherein the monitoring devices are configured to capture a plurality of audio signals in an environment and to capture a plurality of location tracking signals which respectively indicate the locations of the monitoring devices over time during capture of the plurality of audio signals; and
a processor configured to receive the plurality of audio signals and the plurality of location tracking signals, to identify a known source sound within the plurality of audio signals, to identify and associate one or more environment-altered sounds with the known source sound, to determine one or more acoustic properties of the environment based on the audio signals, the location tracking signals, the known source sound, and the one or more associated environment-altered sounds, and to use the one or more acoustic properties to enhance audio played to a user during a virtual reality, augmented reality, or mixed reality experience.

2. The system of claim 1, wherein the one or more acoustic properties comprise acoustic reflectance or absorption in the environment, or the acoustic frequency response of the environment.

3. The system of claim 1, wherein there is an unknown relative spatial relationship between the plurality of distributed monitoring devices.

4. The system of claim 1, wherein the plurality of distributed monitoring devices are mobile.

5. The system of claim 1, wherein the location tracking unit comprises a Global Positioning System (GPS).

6. The system of claim 1, wherein the location tracking signals also comprise information about the respective orientations of the monitoring devices.

7. The system of claim 1, wherein the known source sound comprises a sound played by one of the virtual reality, augmented reality, or mixed reality systems.

8. The system of claim 7, wherein the known source sound comprises an acoustic impulse or a sweep of acoustic tones.

9. The system of claim 1, wherein the known source sound comprises an utterance of a user captured by a virtual reality, augmented reality, or mixed reality system worn by the user.

10. A device comprising:
   a processor configured to carry out a method comprising
      receiving, from a plurality of distributed monitoring devices, which comprise wearable virtual reality, augmented reality, or mixed reality display systems, a plurality of audio signals captured in an environment;
      receiving, from the plurality of monitoring devices, a plurality of location tracking signals, the plurality of location tracking signals respectively indicating the locations of the monitoring devices over time during capture of the plurality of audio signals;
      identifying a known source sound within the plurality of audio signals;
      identifying and associating one or more environment-altered sounds with the known source sound;
      determining one or more acoustic properties of the environment based on the audio signals, the location tracking signals, the known source sound, and the one or more associated environment-altered sounds; and
      using the one or more acoustic properties to enhance audio played to a user during a virtual reality, augmented reality, or mixed reality experience; and
   a memory to store the audio signals and the location tracking signals.

11. The device of claim 10, wherein the one or more acoustic properties comprise acoustic reflectance or absorption in the environment, or the acoustic frequency response of the environment.

12. The device of claim 10, wherein the location tracking signals also comprise information about the respective orientations of the monitoring devices.

13. The system of claim 10, wherein the known source sound comprises a sound played by one of the virtual reality, augmented reality, or mixed reality systems.

14. The device of claim 13, wherein the known source sound comprises an acoustic impulse or a sweep of acoustic tones.

15. The system of claim 10, wherein the known source sound comprises an utterance of a user captured by a virtual reality, augmented reality, or mixed reality system worn by the user.

16. A method comprising:
   receiving, from a plurality of distributed monitoring devices, which comprise wearable virtual reality, augmented reality, or mixed reality display systems, a plurality of audio signals captured in an environment;
   receiving, from the plurality of monitoring devices, a plurality of location tracking signals, the plurality of location tracking signals respectively indicating the locations of the monitoring devices over time during capture of the plurality of audio signals;
   identifying a known source sound within the plurality of audio signals;
   identifying and associating one or more environment-altered sounds with the known source sound;
   determining one or more acoustic properties of the environment based on the audio signals, the location tracking signals, the known source sound, and the one or more associated environment-altered sounds; and
   using the one or more acoustic properties to enhance audio played to a user during a virtual reality, augmented reality, or mixed reality experience.

17. The method of claim 16, wherein the one or more acoustic properties comprise acoustic reflectance or absorption in the environment, or the acoustic frequency response of the environment.

18. The method of claim 16, wherein the location tracking signals also comprise information about the respective orientations of the monitoring devices.

19. The system of claim 16, wherein the known source sound comprises a sound played by one of the virtual reality, augmented reality, or mixed reality systems.

20. The method of claim 19, wherein the known source sound comprises an acoustic impulse or a sweep of acoustic tones.

21. The system of claim 16, wherein the known source sound comprises an utterance of a user captured by a virtual reality, augmented reality, or mixed reality system worn by the user.

* * * * *